(12) United States Patent
Kuriki

(10) Patent No.: US 12,445,735 B2
(45) Date of Patent: Oct. 14, 2025

(54) APPARATUS HAVING EXPOSURE CONTROL, IMAGING APPARATUS, CONTROL METHOD, AND STORAGE MEDIUM

(71) Applicant: CANON KABUSHIKI KAISHA, Tokyo (JP)

(72) Inventor: Yoma Kuriki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 113 days.

(21) Appl. No.: 18/516,790

(22) Filed: Nov. 21, 2023

(65) Prior Publication Data

US 2024/0179418 A1   May 30, 2024

(30) Foreign Application Priority Data

Nov. 28, 2022   (JP) .................................. 2022-188973

(51) Int. Cl.
| | | |
|---|---|---|
| *H04N 23/73* | (2023.01) | |
| *G06V 10/60* | (2022.01) | |
| *G09G 5/377* | (2006.01) | |
| *H04N 23/61* | (2023.01) | |

(52) U.S. Cl.
CPC .............. *H04N 23/73* (2023.01); *G06V 10/60* (2022.01); *G09G 5/377* (2013.01); *H04N 23/61* (2023.01); *G06V 2201/07* (2022.01)

(58) Field of Classification Search
CPC ...... H04N 23/61; H04N 23/611; H04N 23/70; H04N 23/667; H04N 23/71; H04N 23/73; G06V 10/60; G06V 2201/07; G09G 5/377

USPC ......................................................... 348/362
See application file for complete search history.

(56) References Cited

U.S. PATENT DOCUMENTS

| | | | | |
|---|---|---|---|---|
| 9,148,638 | B2 * | 9/2015 | Hamada ................. | H04N 23/88 |
| 9,710,895 | B2 * | 7/2017 | Hayashi ................... | G06T 5/73 |
| 10,290,219 | B2 * | 5/2019 | Deng ...................... | G06V 10/20 |
| 10,908,478 | B2 * | 2/2021 | Yoshino ................. | G03B 13/36 |
| 2006/0044459 | A1 * | 3/2006 | Kato ...................... | H04N 23/71 |
| | | | | 348/E5.035 |
| 2013/0113957 | A1 * | 5/2013 | Hamada ................. | H04N 23/71 |
| | | | | 348/223.1 |
| 2016/0117806 | A1 * | 4/2016 | Hayashi ................... | G06T 5/73 |
| | | | | 382/218 |
| 2017/0263139 | A1 * | 9/2017 | Deng ....................... | G06T 7/90 |
| 2019/0313002 | A1 * | 10/2019 | Wu ......................... | H04N 23/71 |

(Continued)

FOREIGN PATENT DOCUMENTS

JP   2015166767 A   9/2015

*Primary Examiner* — Pritham D Prabhakher
(74) *Attorney, Agent, or Firm* — Canon U.S.A., Inc. IP Division

(57) ABSTRACT

An apparatus includes an acquisition unit configured to acquire an image, a detection unit configured to detect an object from the image, a photometry unit configured to perform photometry on the image in accordance with a set photometry mode, wherein the photometry mode includes a first photometry mode in which an exposure is determined by weighting a region having a relatively high luminance value in comparison with a region having a relatively low luminance value at least in a photometry region, and wherein, in a case where the detection unit detects the object in the image in a state where the first photometry mode is selected, the photometry unit performs photometry in the first photometry mode by using a region of the object as the photometry region.

7 Claims, 16 Drawing Sheets

(56) References Cited

U.S. PATENT DOCUMENTS

2020/0012171 A1\* 1/2020 Yoshino ................. G03B 7/003
2021/0145248 A1\* 5/2021 Ito ...................... A61B 1/00006

\* cited by examiner

FIG. 15A

```
┌─────────────────────────────────────────┐
│         AF: SELECT OBJECT(S)            │
├─────────────────────────────────────────┤
│   ☑  HUMAN HEAD                         │
│   ☐  HUMAN BODY                         │
│   ☐  VEHICLE                            │
│                                         │
└─────────────────────────────────────────┘
```

FIG. 15B

```
┌─────────────────────────────────────────┐
│    HIGHLIGHT PHOTOMETRY: SELECT OBJECT(S)│
├─────────────────────────────────────────┤
│   ☑  HUMAN HEAD                         │
│   ☐  HUMAN BODY                         │
│   ☐  VEHICLE                            │
│   ☐  SKY                                │
└─────────────────────────────────────────┘
```

APPARATUS HAVING EXPOSURE CONTROL, IMAGING APPARATUS, CONTROL METHOD, AND STORAGE MEDIUM

BACKGROUND

Technical Field

The aspect of the embodiments relates to an apparatus, an imaging apparatus, a control method, and a storage medium.

Description of the Related Art

Conventional digital cameras perform image capturing through automatic exposure control using an Auto Exposure (AE) function. In the automatic exposure control, setting an exposure of the entire screen to a proper exposure is a typical practice. However, such an automatic exposure control has an issue in a situation where an entire screen is dark but has partially bright regions. More specifically, if such a screen is subjected to photometry to set an exposure of the entire screen to a proper exposure, the bright regions are to be overexposed. Among methods for addressing this issue is a method called highlight photometry in which photometry is mainly performed on a high-luminance region in a screen. The highlight photometry generally uses the maximum output photometry value in the entire screen to set the exposure setting with which overexposure in a high-luminance region is prevented. However, if an extremely high-luminance region exists in a screen during the highlight photometry, the exposure setting may be set such that regions other than the extremely high-luminance region unnecessarily become dark to prevent overexposure of the extremely high-luminance region. Japanese Patent Application Laid-Open No. 2015-166767 discusses a technique for determining an extremely high-luminance region based on an average luminance of an entire screen and excluding the extremely high-luminance region from a photometry operation, to prevent or reduce the influence of the extremely high luminance region.

However, the technique discussed in Japanese Patent Application Laid-Open No. 2015-166767 is able to exclude only the extremely high luminance region. For example, in a case where an imaging object is the face of a person wearing a white cloth, photometry is mainly performed on the cloth, which is a high-luminance region, which lead to image capturing with the face unnecessarily darkened.

SUMMARY

According to an aspect of the embodiments, an apparatus includes at least one processor; and at least one memory coupled to the at least one processor storing instructions that, when executed by the at least one processor, cause the at least one processor to function as an acquisition unit configured to acquire an image, a detection unit configured to detect an object from the image, a calculation unit configured to calculate luminance values of the image, and a photometry unit configured to perform photometry on the image in accordance with a set photometry mode, wherein the photometry mode includes a first photometry mode in which an exposure is determined by weighting a region having a relatively high luminance value in comparison with a region having a relatively low luminance value at least in a photometry region, and wherein, in a case where the detection unit detects the object in the image in a state where the first photometry mode is selected, the photometry unit performs photometry in the first photometry mode by using a region of the object as the photometry region.

Further features of the disclosure will become apparent from the following description of exemplary embodiments with reference to the attached drawings.

BRIEF DESCRIPTION OF THE DRAWINGS

FIG. 15A is a diagram illustrating a display of an object selection menu screen for an Auto Focus (AF) function. FIG. 15B is a diagram illustrating a display of an object selection menu screen for the highlight photometry.

DESCRIPTION OF THE EMBODIMENTS

Figure 1A:
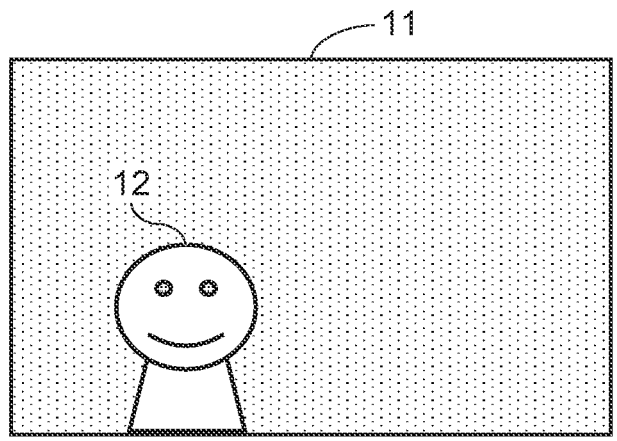
FIG. 1A is a diagram illustrating an image captured with a photometry method in which an entire screen of the image is subjected to photometry to set an exposure of the entire screen to a proper exposure.

Preferable exemplary embodiments of the disclosure will be described in detail below with reference to the accompanying drawings. The following exemplary embodiments do not limit the disclosure within the scope of the appended claims. Although a plurality of features is described in the exemplary embodiments, not all of the plurality of features is indispensable to the disclosure, and the plurality of features may be combined in an arbitrary way. In the accompanying drawings, identical or similar components are assigned the same reference numerals, and the redundant descriptions will be omitted.

Differences between a photometry method in which the entire screen (entire image and entire area) is subjected to photometry to set an exposure of the entire screen to a proper exposure and highlight photometry will be briefly described below with reference to FIGS. 1A, 1B, and 2.

FIG. 1A is a diagram illustrating an image of a person captured using the photometry method in which the entire screen is subjected to photometry to set an exposure of the entire screen to a proper exposure when only the person is illuminated in a dark place. In FIG. 1A, a background region 11 occupying most of the screen is dark and a human region 12 is bright. In the photometry method in which the entire screen is subjected to photometry to set an exposure of the entire screen to a proper exposure, the exposure value is set to high to cause an exposure of the background region 11 occupying most of the screen to be close to the proper exposure. As a result of the setting, in the captured image, the human region 12 is bright and highly likely overexposed.

Figure 1B:
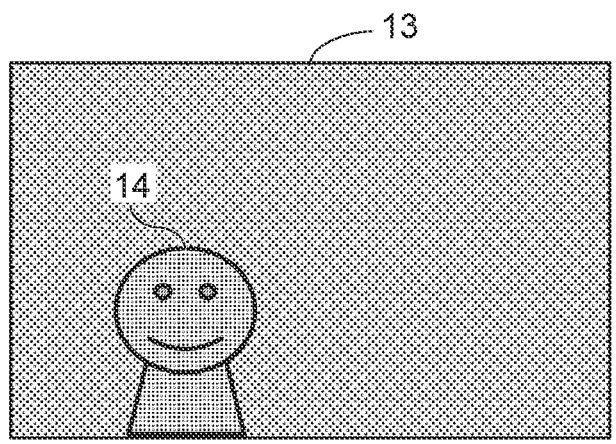
FIG. 1B is a diagram illustrating an image captured with highlight photometry.

FIG. 1B is a diagram illustrating an image captured with the highlight photometry under the similar imaging condition.

Similar to the case illustrated in FIG. 1A, in FIG. 1B, a background region 13 is dark and a human region 14 is bright. Since the highlight photometry generally performs photometry based on the maximum output photometry value in the entire screen, image capturing is able to be performed with an exposure lower than that in FIG. 1A so that the human region 14 having the largest photometry value is not overexposed. Thus, using the highlight photometry enables image capturing without overexposure even in a case of a screen including an object which is highly likely to be overexposed if the photometry method for setting an exposure of the entire screen to a proper exposure is used.

Figure 2:
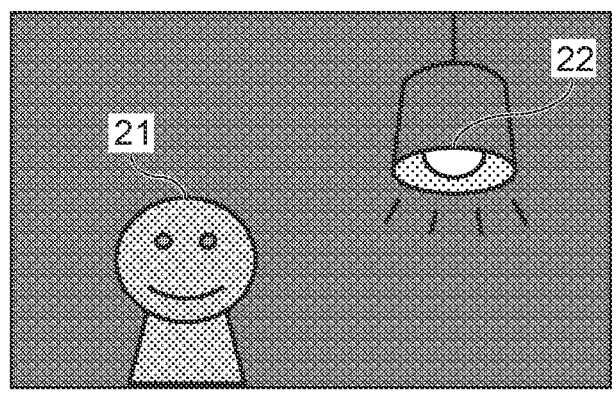
FIG. 2 is a diagram illustrating an image when a high-luminance object is included in the screen illustrated in FIGS. 1A and 1B.

FIG. 2 is a diagram illustrating an image captured using the highlight photometry when a high-luminance object, such as an illumination, is included in a screen under conditions similar to that in FIGS. 1A and 1B. The screen illustrated in FIG. 2 includes an illumination region 22 as a high-luminance object. In the highlight photometry, photometry is performed based on the maximum output photometry value in the entire screen, to perform the exposure setting in such a manner that overexposure of the illumination region 22 is reduced or prevented. Consequently, in a captured image, a human region 21 having a luminance value lower than the luminance value of the illumination region 22 becomes darker than the human region 14 illustrated in FIG. 1B. This means that, in a case where the user's target object is the human region 21, the human region 21 becomes unnecessarily dark in the captured image.

In the first exemplary embodiment, photometry is performed in a region of a detected object in the highlight photometry mode, to avoid the object being affected by high-luminance regions outside the object region.

Figure 3:
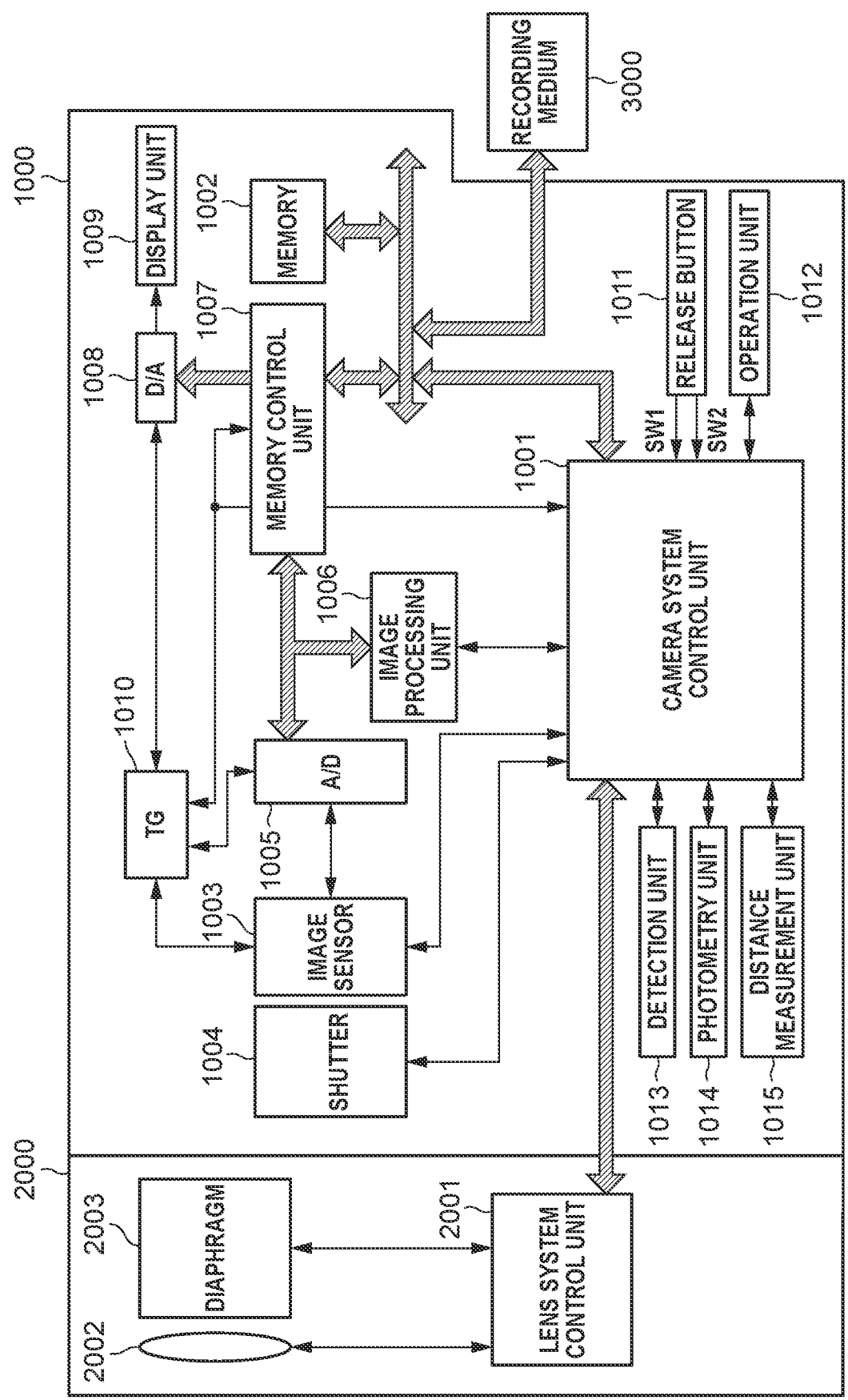
FIG. 3 is a block diagram illustrating a configuration of an imaging apparatus according to each exemplary embodiment.

FIG. 3 is a block diagram illustrating a configuration of a camera as an example of an imaging apparatus according to a first exemplary embodiment of the disclosure. The camera according to the present exemplary embodiment includes a camera body 1000, and a lens unit 2000 attachable to and detachable from the camera body 1000. The lens unit 2000 includes an optical system that supports the camera body 1000. The camera body 1000 and the lens unit 2000 may be integrally configured as one unit. A camera configuration where the lens unit 2000 is attached to the camera body 1000 will be described below with reference to FIG. 3.

A camera system control unit 1001 is a control unit for entirely controlling various units in the camera body 1000. A memory 1002 includes a Random Access Memory (RAM) and a Read Only Memory (ROM) connected to the camera system control unit 1001. An image sensor 1003 is a charge storage type image sensor, such as a complementary metal oxide semiconductor (CMOS) sensor. The image sensor 1003 photoelectrically converts an object image focused on the image sensor 1003 via the lens unit 2000 serving as an optical system and outputs analog image data. A shutter 1004 is controlled and driven by signals from the camera system control unit 1001. The shutter 1004 operates in two states: a light-shielding state in which the image sensor 1003 is shielded from a light flux incident through the lens unit 2000 and a retracted state in which an object optical image incident through the lens unit 2000 is guided to the image sensor 1003.

An analog-to-digital (A/D) conversion unit 1005 converts the analog image data output from the image sensor 1003 into digital image data, and the digital image data is recorded in the memory 1002.

An image processing unit 1006 performs various processing, such as pixel interpolation processing and color conversion processing, on the data from the A/D conversion unit 1005 or data from a memory control unit 1007. The image processing unit 1006 also performs other processing, such as resize processing, conversion processing, and correction processing for image signals of saturated pixels and underexposure pixels, on the data. Image data obtained by these pieces of processing is stored in the memory 1002 again via the memory control unit 1007.

A digital-to-analog (D/A) conversion unit 1008 converts the digital image data recorded in the memory 1002 into an analog image signal for display. A display unit 1009 includes a thin film transistor-driven liquid crystal display (TFT-driven LCD) to display images based on the analog image signal for display. The display unit 1009 also displays a live view by successively displaying image data, acquired through image capturing, via the D/A conversion unit 1008. The display unit 1009 also displays various information in addition to the acquired image data. The display of the image data and various information to be displayed on the display unit 1009 is able to be controlled by the camera system control unit 1001.

A timing generator (hereinafter abbreviated to a TG) 1010 transmits an exposure timing and a frame rate change of the image sensor 1003, a shielding timing of the shutter 1004, and timings of other camera operations to various units of the camera.

A release button 1011 and an operation unit 1012 are operation units via which the user inputs various operation instructions to the camera system control unit 1001. The release button 1011 is an instruction unit for issuing an instruction for starting an imaging preparation operation and an imaging operation. When the user changes the release button 1011 to an SW1 state (for example, half press state), the release button 1011 issues an instruction for starting the imaging preparation operation to start distance measurement operation processing and photometry calculation processing. When the user changes the release button 1011 to an SW2 state (for example, full press state), the release button 1011 issues an instruction for starting the imaging operation to start a series of processing from image capturing of an object to image acquisition.

The operation unit 1012 includes switches, buttons, dials, and other operation members (the power switch, menu buttons, and direction buttons) that are used by the user to issue various instructions and make various settings on the camera body 1000. The display unit 1009 as a capacitive-type touch panel may be configured to receive an information input operation similar to that performed on the operation unit 1012 via a User Interface (UI) displayed on the display unit 1009.

A detection unit 1013 performs detection processing to detect a specific object by using image data obtained from the image processing unit 1006. Known techniques may be used for the detection processing performed by the detection unit 1013. Examples of usable techniques include a convolutional neural network (CNN) that completed machine learning, and a learned model generated through machine learning using, for example, a support vector machine and decision tree. Any object detection technique not using machine learning can also be used.

A photometry unit 1014 performs photometry operations by using image data obtained from the image processing unit 1006. The photometry operations will be described in detail below. The photometry unit 1014 calculates luminance values (photometry values) in a predetermined region (photometry frame) in a screen in accordance with a set photometry method to determine exposure control values. Examples of selectable photometry methods, in addition to the above-described highlight photometry, include spot photometry for performing photometry at a specific set position, evaluation photometry in which the camera automatically determines a photometry frame position according to a scene, and center-weighted average photometry for averagely performing photometry for an entire screen centering on the central part of the screen.

A distance measurement unit 1015 performs distance measurement operations by using image data obtained from the image processing unit 1006. Examples of known distance measurement operation methods include an image plane phase difference method. In the present exemplary embodiment, the camera system control unit 1001 calculates the amount of deviation of an object image acquired by the image sensor 1003 by using the image data obtained from the image processing unit 1006. A lens system control unit 2001 (described below) controls the lens unit 2000 based on the calculated amount of deviation of the object image to focus on the object, whereby the distance measurement (focusing processing) is completed. The distance measurement operation method is not limited to the above-described method, but existing methods can also be used.

The distance measurement unit 1015 and the photometry unit 1014 may be integrally configured with the camera system control unit 1001. In this case, the camera system control unit 1001 performs the above-described various processing.

The lens system control unit 2001 controls entire operations of the lens unit 2000. In a state where the lens unit 2000 is attached to the camera body 1000, the lens system control unit 2001 and the camera system control unit 1001 are able to communicate with each other via an interface (not illustrated). For example, in response to an instruction from the camera system control unit 1001, information about the lens unit 2000 attached to the camera body 1000 is output to the camera system control unit 1001. An imaging lens group 2002 includes a plurality of lenses, such as an optical axis shift lens, a zoom lens, and a focusing lens. A diaphragm 2003 is a light quantity adjustment member for adjusting the light quantity of a light flux having transmitted through the imaging lens group 2002. The diaphragm 2003 is driven and controlled by the lens system control unit 2001. In a configuration in which the lens unit 2000 does not include the lens system control unit 2001, operations of the imaging lens group 2002 and the diaphragm 2003 are controlled based on instructions from the camera system control unit 1001.

A recording medium 3000 is a memory card or a hard disk capable of recording image data recorded in the memory 1002. The recording medium 3000 is not limited to a memory card insertable into and removable from the camera body 1000. Examples of recording media include an optical disk such, as a digital versatile disc rewritable (DVD-RW) disc, and a magnetic disk, such as a hard disk. Further, the recording medium 3000 may be not removable but built in the camera body 1000.

The above descriptions are of the basic configuration of the camera according to the present exemplary embodiment.

The highlight photometry method and an average photometry method as an example of a photometry method other than the highlight photometry method will be describes below with reference to FIGS. 4A and 4B. The photometry unit 1014 calculates evaluation values by using image data obtained from the image sensor 1003.

Figure 4A:
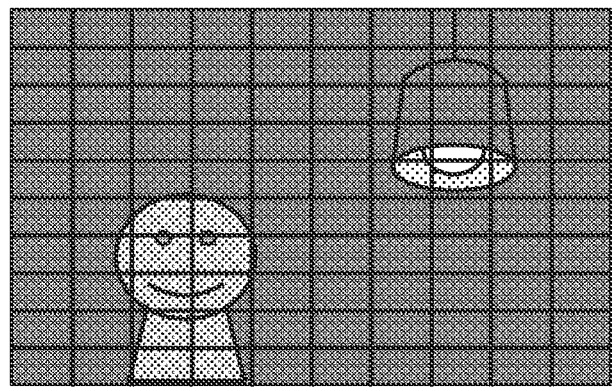
FIG. 4A is a diagram illustrating an image of division regions for calculating evaluation values in the screen illustrated in FIG. 2.
Figure 4B:
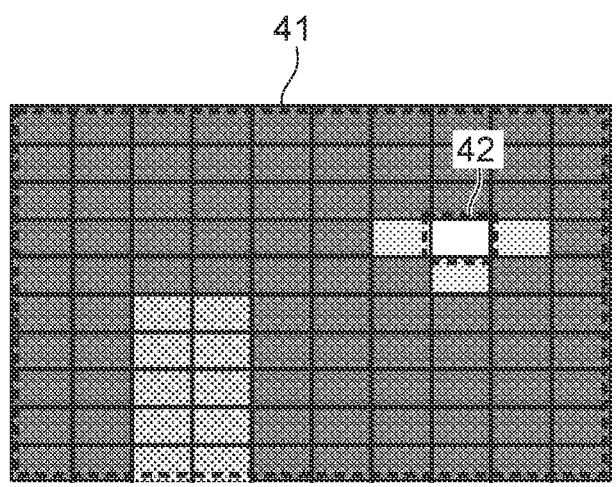
FIG. 4B is a diagram illustrating an image of evaluation values in the screen illustrated in FIG. 2.

FIGS. 4A and 4B are diagrams illustrating a method that is performed by the photometry unit 1014 to obtain evaluation values in the screen illustrating in FIG. 2. The photometry unit 1014 calculates, as an evaluation value, the average of luminance values of pixels included in each division region having a certain size, as illustrated in FIG. 4A. While, in the example illustrated in FIG. 4A, the image is divided into 10×10 regions, the number of divisions and the division method are not limited thereto. In FIG. 4B, a region 41 is an evaluation value region for the entire screen, and a region 42 is one of division evaluation value regions including the illumination region 22. In this example, the evaluation value of the region 42 is the brightest among the division regions in the screen and has the largest evaluation value.

Then, the photometry unit 1014 uses the obtained evaluation values to calculate photometry values in each photometry method. In the highlight photometry method, the photometry unit 1014 performs photometry operations based on the largest evaluation value in the screen, i.e., the evaluation value of the region 42 in FIG. 4B, to set the exposure setting in such a manner that an exposure of the region 42 having the largest evaluation value is set to the proper exposure. In the average photometry method, the photometry unit 1014 performs photometry operations based on the average of evaluation values of the entire screen, i.e., evaluation values of the region 41, to set the exposure setting in such a manner that an average luminance of the entire screen is to be at the proper level.

Processing procedure of regular live view static image capturing will be described below with reference to FIG. 5.

Figure 5:
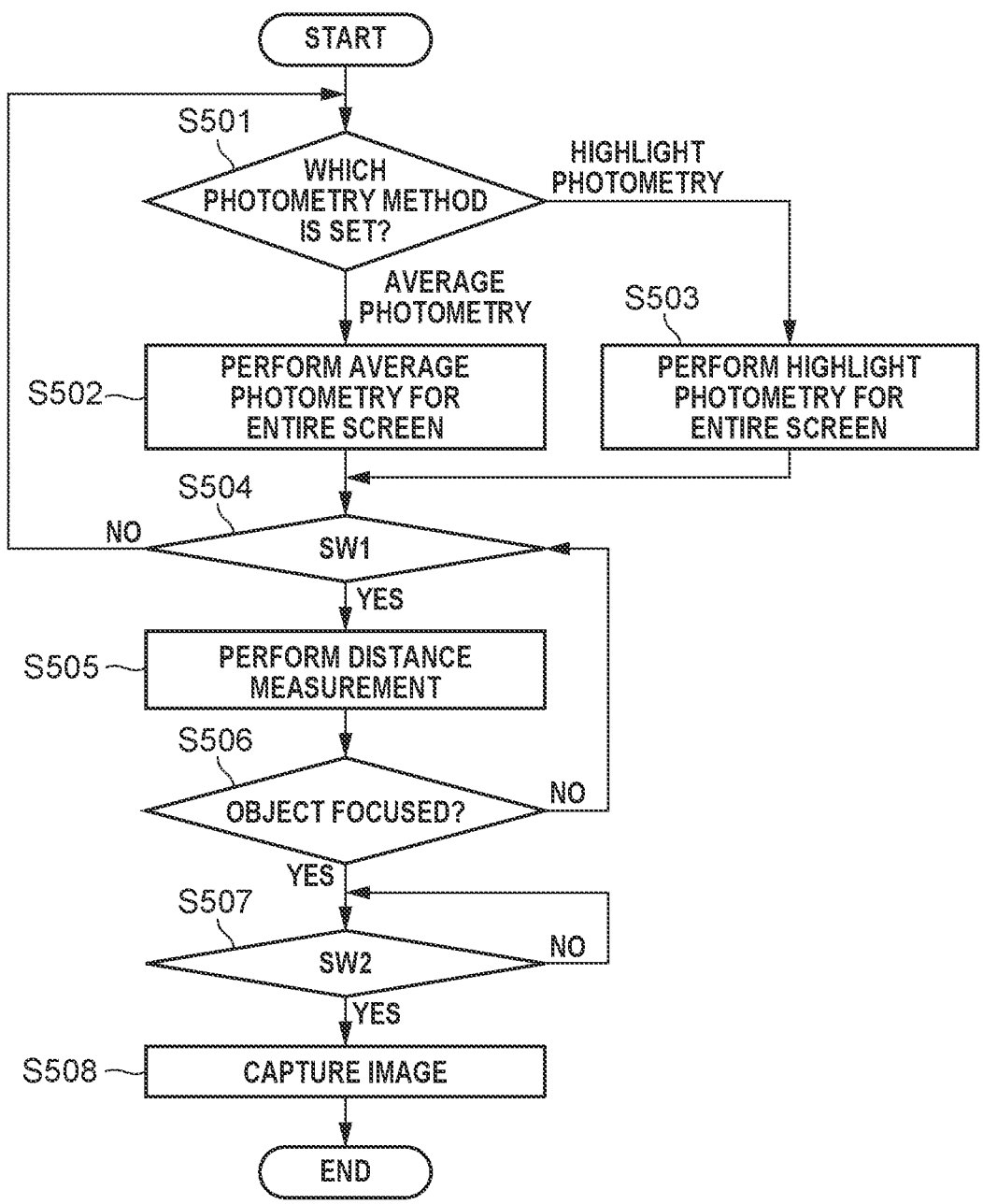
FIG. 5 is a flowchart illustrating a process of static image capturing according to each exemplary embodiment.

FIG. 5 is a flowchart illustrating the distance measurement and photometry for regular live view static image capturing. The procedure of the flowchart starts in a state where the user has preset the photometry method with the camera main body 1000 activated. Each process of the flowchart is executed by the camera system control unit 1001 or various units in the camera main body 1000 based on instructions issued from the camera system control unit 1001.

In step S501, the camera system control unit 1001 determines the photometry method preset by the user. The photometry method may be set by the user via the operation unit 1012. The camera system control unit 1001 may control the display of the display unit 1009 to display the set photometry method so that the user is able to check the set photometry method via the display unit 1009. In a case where the camera system control unit 1001 determines that the average photometry has been set (AVERAGE PHOTOMETRY in step S501), the processing proceeds to step S502. In step S502, the photometry unit 1014 performs photometry based on an average luminance of the entire screen. On the other hand, in a case where the camera system control unit 1001 determines that the highlight photometry is preset (HIGHLIGHT PHOTOMETRY in step S501), the processing proceeds to step S503. In step S503, the photometry unit 1014 performs photometry based on the largest luminance of the entire screen (highlight photometry). While, in the present exemplary embodiment, photometry is performed based on the largest luminance, the disclosure is not limited thereto. The issue addressed by the disclosure is to be resolved to a certain extent if the photometry is performed based on a relatively high luminance value in the screen. Therefore, the photometry may be performed based on a relatively high luminance value (for example, the average luminance value of top 5% of luminance values when a luminance histogram is generated) in the screen.

While, in the present exemplary embodiment, the description is given using a case in which the average photometry is performed using luminance values of the entire screen, as a photometry method other than the highlight photometry, the photometry method is not limited thereto. Examples of applicable photometry include object priority photometry for performing control to preferentially set the exposure of a particular detected object to the proper exposure. In the object priority photometry, the photometry unit 1014 performs photometry by weighing luminance of a detected object region in comparison with luminance of other regions. More specifically, the photometry unit 1014 calculates the average luminance value of the detected object region and the average luminance value of the entire screen, calculates a weighted average of the two average luminance values by weighting the average luminance value of the object region with a larger weight, and performs photometry based on the calculated luminance values.

Processes of step S504 and subsequent steps in the flowchart are a processing procedure from distance measurement to image capturing. The loop of processes from step S501 to step S504 is repeated at predetermined intervals to repetitively perform the photometry processing described in steps S502 and S503. In a case where the release button 1011 enters the SW1 state (YES in step S504), the processing proceeds to step S505. In step S505, the distance measurement unit 1015 starts the distance measurement (focus detection).

In step S506, the distance measurement unit 1015 performs determination of a result of the distance measurement in step S505. In a case where the distance measurement unit 1015 fails to focus on an object detected by the detection unit 1013 or an object closest to the camera within a focus detectable range (NO in step S506), the processing returns to S504. In step S504, the photometry unit 1014 repeats the photometry processing until the release button 1011 enters the SW1 state again. In a case where the distance measurement unit 1015 focuses on the object (YES in step S506), the processing proceeds to step S507. In a case where the release button 1011 enters the SW2 state (YES in step S507), the processing proceeds to step S508. In step S508, the camera performs image capturing processing. This completes the processing procedure of regular live view static image capturing.

Figure 6:
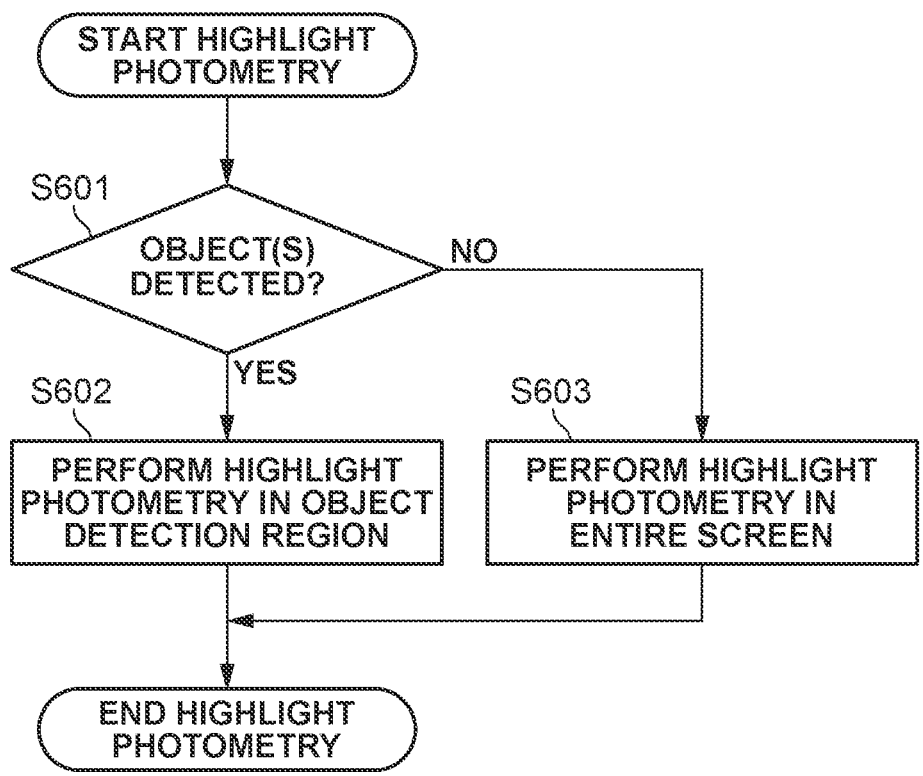
FIG. 6 is a flowchart illustrating a process of the highlight photometry according to each exemplary embodiment.

Processing and a method of the highlight photometry according to the first exemplary embodiment of the disclosure will be described below with reference to FIG. 6. FIG. 6 is a flowchart illustrating a processing procedure of the highlight photometry according to the first exemplary embodiment, which is executed in the processing in step S503 in FIG. 5. In a case where the camera system control unit 1001 determines that the highlight photometry has been set as the photometry method (HIGHLIGHT PHOTOMETRY in step S501 in FIG. 5), the processing enters the flowchart illustrated in FIG. 6 corresponding to step S503.

In step S601, the detection unit 1013 determines whether any object(s) is detected. The object(s) indicates one or a plurality of objects among objects detectable by the detection unit 1013. Examples of the detectable objects include a human head, a human body, a vehicle, and the sky, but the aspect of the embodiments is not limited thereto.

In a case where the detection unit 1013 determines that an object is detected (YES in step S601), the processing proceeds to step S602. In step S602, the photometry unit 1014 performs the highlight photometry by using only luminance values in a region corresponding to the detected object (object detection region).

The highlight photometry that is performed on the object detection region will be described below with reference to FIGS. 7A and 7B.

Figure 7A:
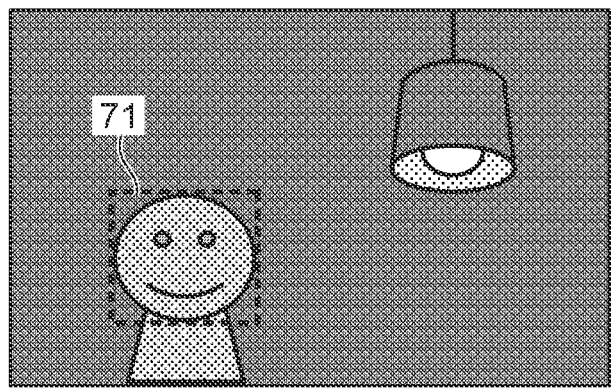
FIG. 7A is a diagram illustrating an object detection region in object detection detecting a human head in the screen illustrated in FIG. 2.
Figure 7B:
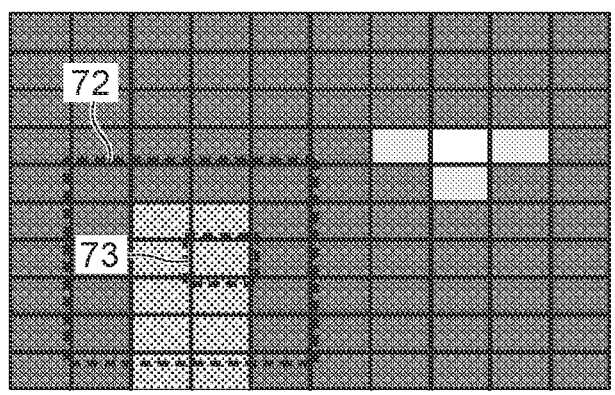
FIG. 7B is a diagram illustrating evaluation values in the object detection detecting the human head in the screen in FIG. 2.

FIG. 7A is a diagram illustrating a state in which the detection unit 1013 detects a human head as a detected object in a screen similar to the screen illustrated in FIG. 2, which includes an object detection region 71. FIG. 7B is a diagram illustrating evaluation values in the state illustrated in FIG. 7A. In the highlight photometry that is performed in the object detection region in step S602, the photometry unit 1014 performs photometry operations using only evaluation values within a division range 72 among evaluation values including evaluation values of the object detection region. In a case where the largest evaluation value in the division range 72 is of a region 73, the photometry unit 1014 performs photometry operations based on the evaluation value of the region 73, to set the exposure setting in such a manner that an exposure of the region 73 is set to the proper exposure.

In a case where the detection unit 1013 determines that no object is detected (NO in step S601), the processing proceeds to step S603. In step S603, the photometry unit 1014 performs the highlight photometry in the entire screen. In step S603, the photometry unit 1014 performs photometry operations based on the largest evaluation value region in the range of the region 41 which is the entire screen, as described above with reference to FIG. 4B.

This completes the processing procedure of the highlight photometry using the method according to the first exemplary embodiment. In the conventional highlight photometry, the highlight photometry is not performed in the object detection region as illustrated in FIG. 6 but is performed based on the largest evaluation value in the entire screen. Consequently, even in a case where the user performs image capturing to capture the human region 21 as an object in the screen in FIG. 2, the exposure is performed to adjust brightness of the illumination region 22, but not the object, to be a proper brightness. Thus, the human region 21 is dark in the captured image. In contrast, in a case where the highlight photometry is performed in the object detection region as illustrated in FIG. 6, the exposure is set in such a manner that brightness is adjusted to be proper brightness with respect to the largest evaluation value in the human region 21.

As described above, according to the first exemplary embodiment, photometry is performed in the detected object region in the highlight photometry mode, whereby underexposure of the detected object region due to high-luminance regions outside the detected object region is able to be prevented.

The first exemplary embodiment still has an issue that depending on the detected object, a significant exposure change may occur due to an unstable result of the highlight photometry. Thus, in a second exemplary embodiment, the photometric processing is changed in accordance with a type of the detected object in a case where the highlight photometry is performed in the object detection region. Elements in the present exemplary embodiment denoted by the same reference numerals as those in the first exemplary embodiment perform operations and processing similar to the first exemplary embodiment, and the redundant descriptions will be omitted.

Processing procedure of static image capturing according to the present exemplary embodiment of the disclosure will be described below with reference to the flowcharts illustrated in FIGS. 5 and 6 and the images in FIGS. 8A, 8B, and 8C. Each processing of the flowcharts is executed by the camera system control unit 1001 or various units in the camera body 1000 according to instructions issued from the camera system control unit 1001.

Processing procedure of live view static image capturing according to the present exemplary embodiment is similar to the processing in the flowchart in FIG. 5 and the processing according to the first exemplary embodiment. In a case where the camera system control unit 1001 determines that the photometry method is the highlight photometry (HIGHLIGHT PHOTOMETRY in step S501), the processing enters the processing procedure of the flowchart illustrated in FIG. 6. This processing is also similar to the processing in the first exemplary embodiment, and the redundant descriptions will be omitted.

According to the present exemplary embodiment, when performing the highlight photometry in the object detection region in step S602 of the flowchart in FIG. 6, the photometry unit 1014 changes the photometry processing in accordance with a type of the detected object.

As a first example, a case where the detection unit 1013 has detected a vehicle as an object will be described below. In a case where the object is a vehicle, the object may move in a high speed. FIGS. 8A, 8B, and 8C are diagrams illustrating images of a case where a vehicle moves in a right direction, and a high-luminance object exists in front of the vehicle. The images illustrated in FIGS. 8A, 8B, and 8C are captured in this time order.

Figure 8A:
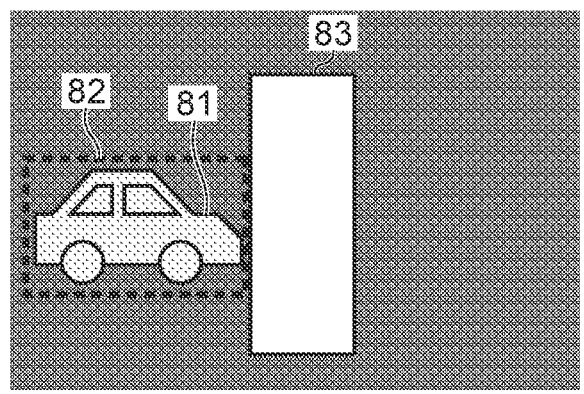
FIGS. 8A, 8B, and 8C are diagrams illustrating images of object detection regions in object detection detecting a vehicle.

In FIG. 8A, a vehicle 81 moves in the right direction, and an object detection region 82 is detected as a region indicating the vehicle 81 as an object. A high-luminance object 83, such as a white object or an electric lamp, exists in front of the vehicle 81 (on a side with the user of the camera). In FIG. 8B, the vehicle 81 captured in the image illustrated in FIG. 8A moves in the right direction and reaches the position of a vehicle 84. In this state, a high-luminance object 86 is included in an object detection region 85. In FIG. 8C, the vehicle 84 captured in the image illustrated in FIG. 8B further moves in the right direction and reaches the position of a vehicle 87. In this case, a high-luminance object 89 is not included in an object detection region 88.

Figure 8B:
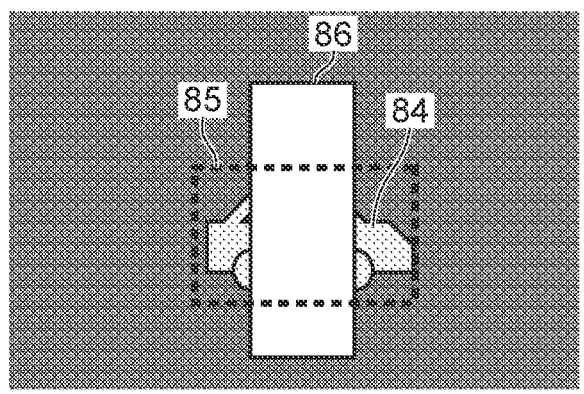
Figure 8C:
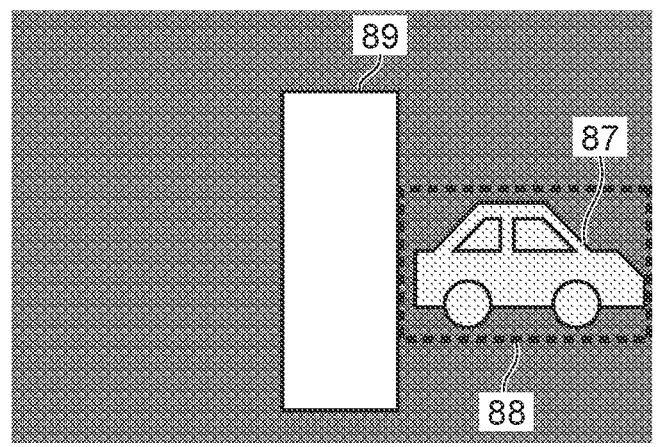
Figure 9A:
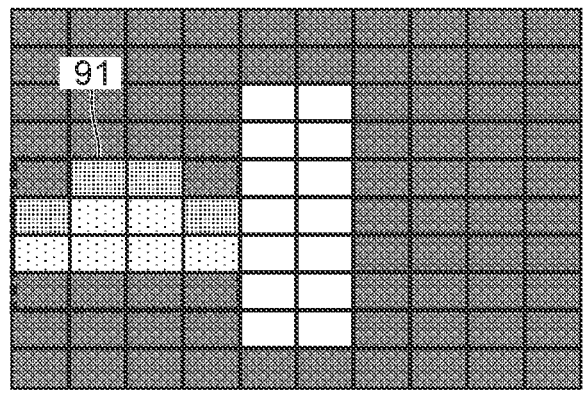
FIGS. 9A, 9B, and 9C are diagrams illustrating images of evaluation values corresponding to FIGS. 8A, 8B, and 8C, respectively.
Figure 9B:
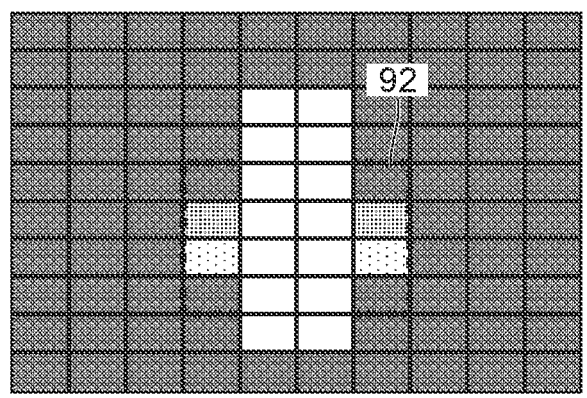
Figure 9C:
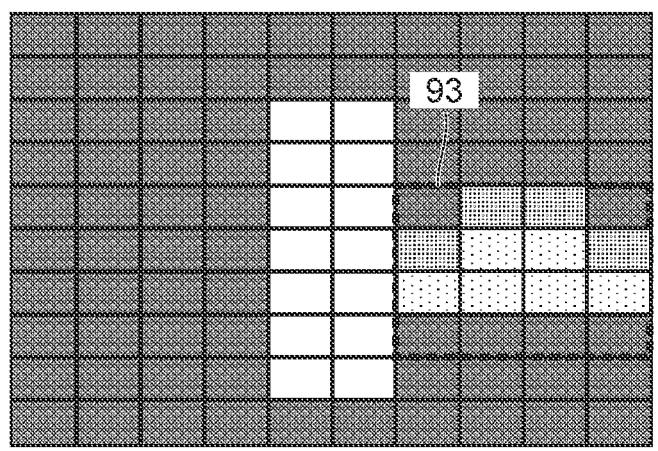

FIGS. 9A, 9B, and 9C are diagrams illustrating changes in evaluation values calculated by the photometry unit 1014 when a screen composition changes with the movement of the vehicle in the above described way. FIGS. 9A, 9B, and 9C correspond to FIGS. 8A, 8B, and 8C, respectively. More specifically, object detection regions 91, 92, and 93 indicate the object detection regions 82, 85, and 88 in FIGS. 8A, 8B, and 8C, respectively. In FIGS. 9A and 9C, evaluation values of the object detection regions 91 and 93 correspond to regions of the vehicles 81 and 87 in FIGS. 8A and 8C, respectively. In FIG. 9B, evaluation values of the object detection region 92 include evaluation values corresponding to regions of the high-luminance object 86 in addition to the vehicle 84.

Figure 10A:
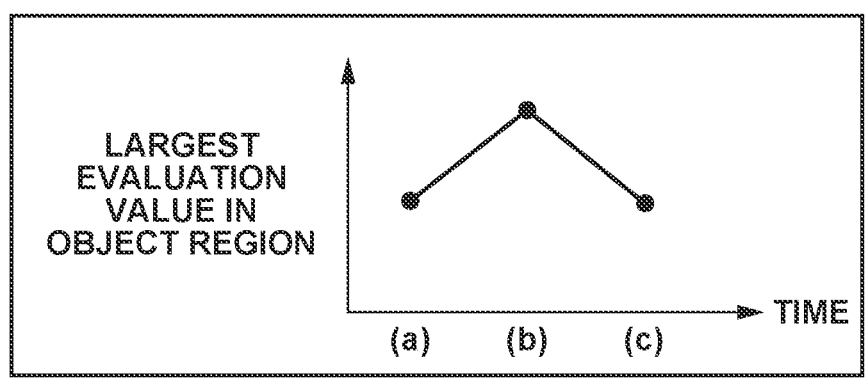
FIG. 10A is a diagram illustrating variations of a largest evaluation value of the object detection regions illustrated in FIGS. 9A, 9B, and 9C.

FIG. 10A is a diagram illustrating variations of the largest evaluation value in the object detection region in the evaluation values in FIGS. 9A, 9B, and 9C. In FIG. 10A, the vertical axis represents the largest evaluation value in the object detection region, and the horizontal axis represents time. Times (a), (b), and (c) on the horizontal axis correspond to the times when the images illustrated in FIGS. 8A, 8B, and 8C are acquired, respectively. In a case where the largest evaluation value largely changes between the time (a) and (b) in FIG. 10A, the exposure rapidly changes based on the highlight photometry. As a result, brightness of the acquired image significantly changes, which causes flickering in displayed images.

With respect to the flickering, in a case where an object is a vehicle, a method for decreasing an exposure tracking speed may be used to prevent a significant exposure change. As a specific example of calculations of the largest evaluation value, the largest evaluation value of n-time past imaging operations is stored, and an average of the stored values is used as a current largest evaluation value. The following formula is used:

$$M_{average} = \sum_{i=0}^{n} M_i,$$

where $M_{average}$ is the largest evaluation value obtained by the calculation and $M_i$ is the largest evaluation value in the i-time past imaging operations.

Figure 10B:
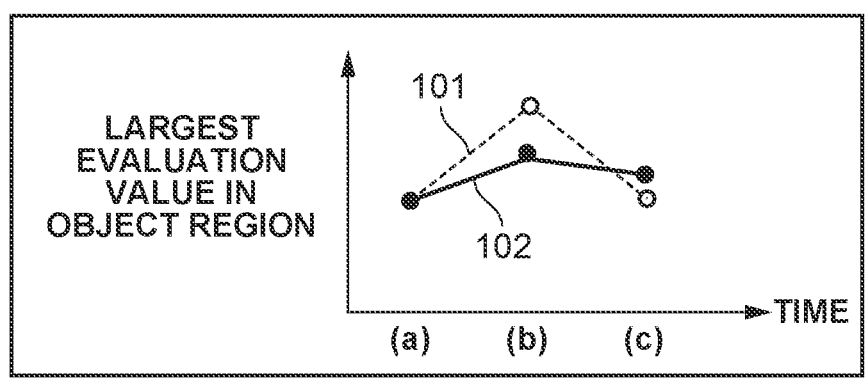
FIG. 10B is a diagram illustrating variations of a time-average of the largest evaluation value of the object detection regions illustrated in FIGS. 9A, 9B, and 9C.

FIG. 10B is a diagram illustrating variations of averaged largest evaluation values corresponding to the largest evaluation values in FIG. 10A. A dotted line 101 in FIG. 10B indicates the same chart as that in FIG. 10A, and a solid line 102 indicates the averaged largest evaluation values. Averaging the largest evaluation values decreases variations of the largest evaluation values. This results in prevention of variation in the amount of exposure and prevention of a significant exposure change, whereby flickering due to variations in brightness of displayed images is prevented.

In a state where the vehicle 84 as an object is behind the high-luminance object 86, as illustrated in FIG. 8B, the detection unit 1013 may fail to detect the object. More specifically, in FIGS. 8A, 8B, and 8C, the detection unit 1013 detects the vehicle 81 in FIG. 8A, fails to detect the vehicle 84 in FIG. 8B, and detects the vehicle 87 again in FIG. 8C. In such a case, in FIG. 8B, the photometry unit 1014 performs the highlight photometry for the entire screen since the vehicle 84 is not detected, which results in performing an exposure setting that has been set based on evaluation values of the high-luminance object 86. This means that the largest evaluation value changes as illustrated in FIG. 10A, which may cause a significant exposure change. In a case of such an object detection failure, the object detection may be immediately recovered in some cases as described above. However, there is also a case in which the object moves out of the angle of field, and the object originally detected is not detected again. Thus, in a case where the object detection fails, the photometry unit 1014 performs the highlight photometry for the entire screen with the limited amount of exposure reduction. For example, the amount of exposure reduction is limited to one lower level, which enables prevention of screen flickering in consideration of a case where the object is immediately detected again while performing the highlight photometry for the entire screen in consideration of a case where the object has been moved out of the angle of field and does not return. While, in the present exemplary embodiment, the object is a vehicle (automobile), a similar situation may arise even in a case where the object is a moving animal or bird.

Figure 11A:
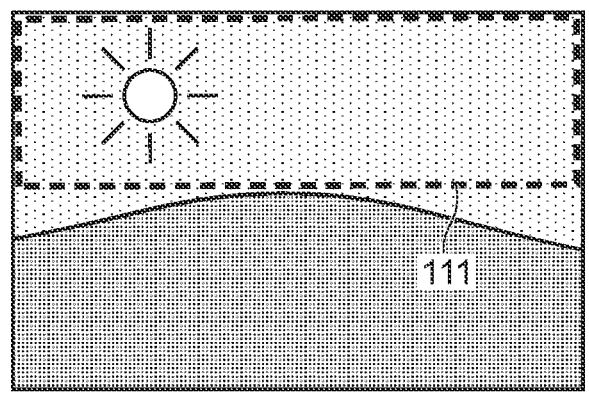
FIG. 11A is a diagram illustrating an image of an object detection region in object detection detecting the sky.
Figure 11B:
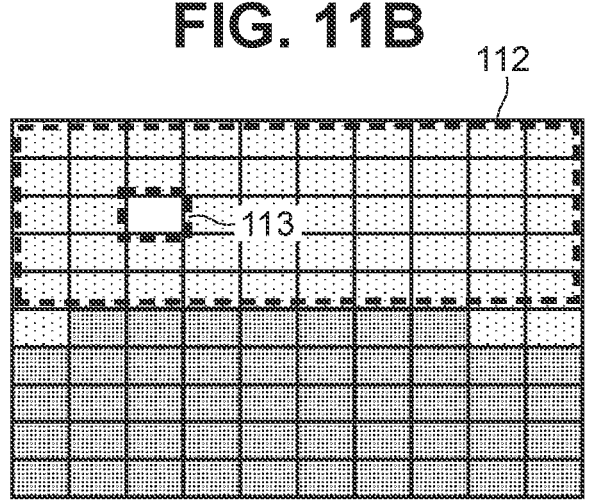
FIG. 11B is a diagram illustrating an image of evaluation values corresponding to the screen illustrated in FIG. 11A.
Figure 11C:
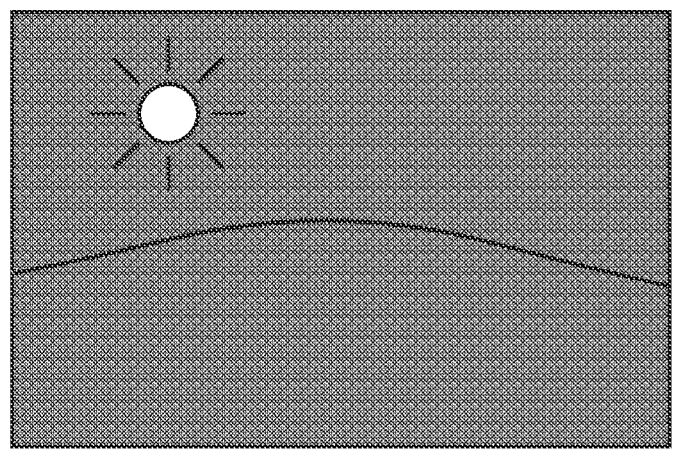
FIG. 11C is a diagram illustrating an image captured when the highlight photometry is performed with the largest evaluation value of a region corresponding to the sun.

As a second example, a case where the detection object is the Sky. FIG. 11A is a diagram illustrating an image including the sky at the upper portion and a mountain at the lower portion. A region 111 in FIG. 11A indicates the object detection region of the sky. FIG. 11B is a diagram illustrating evaluation values corresponding to FIG. 11A. In a region 112 in FIG. 11B, evaluation values are calculated for the object detection region of the sky. A division evaluation value region in the region 112 having the largest evaluation value is an evaluation value region 113 corresponding to a position of the sun. In a case where the highlight photometry is performed in the object detection region, the exposure setting is set in such a manner that an exposure of the evaluation value region 113 having the largest evaluation value is adjusted to the proper exposure. However, since the sun is a strong light source, the exposure of the evaluation value region 113 may not be adjusted to the proper exposure even if the exposure is lowered. Consequently, if the exposure setting is set based on the evaluation value region 113 having the largest evaluation value as in the regular highlight photometry, in a captured image as illustrated in FIG. 11C, regions other than the evaluation value region 113 is dark and the region of the sun is overexposed. In order to prevent this, in a case where the detected object is the sky, the amount of exposure reduction is limited. Limiting the amount of exposure reduction may be performed by a method in which exposure reduction is limited to three lower levels or less from the average photometry value obtained from the entire screen. Limiting the amount of exposure reduction in this way prevents regions other than the region having the largest evaluation value from becoming extremely dark in a captured image in which the largest evaluation value in the region of the detected object is factored.

As described above, according to the second exemplary embodiment, photometry processing is changed in accordance with a type of a detected object, a region of which is subjected to a highlight photometry, whereby an issue arising in accordance with a type of a detected object is prevented.

In a third exemplary embodiment, in view of an issue that the exposure control is not to be appropriately performed when a detected object is not an object intended by the user, the user selects an object which is to be a target of when the highlight photometry is performed in the object detection region. Elements denoted by the same reference numerals as those of the first exemplary embodiment perform operations and processing similar to the first exemplary embodiment, and the redundant descriptions will be omitted.

Figure 12:
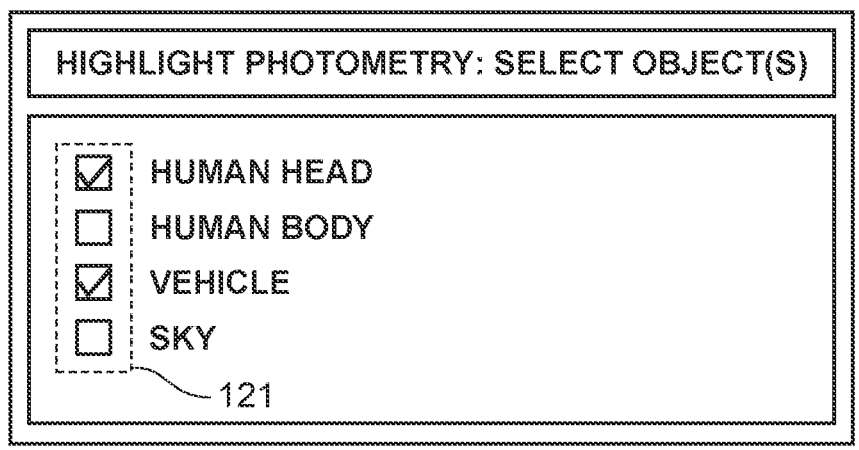
FIG. 12 is a diagram illustrating a display of an object selection menu screen for the highlight photometry.

In the third exemplary embodiment, the user selects an object which is to be a target of when the highlight photometry is performed in the object detection region. While an object is selectable via a menu setting screen displayed on the display unit 1009 of the camera, the selection method is not limited thereto. FIG. 12 is a diagram illustrating a display of selection that is performed via the menu setting screen. In FIG. 12, a list of objects including "Human Head", "Human Body", "Vehicle", and "Sky" are displayed. The number of selection options is not limited to the example illustrated in FIG. 12. Preferably, the menu setting screen displays objects detectable by the detection unit 1013. Check boxes 121 in FIG. 12 each indicate a state where a corresponding object is selected by the user. More specifically, an item of a checked box is selected. In FIG. 12, a human head and a vehicle are selected. A plurality of the objects is selectable as illustrated in FIG. 12, or none of the objects may also be selected. If none of the objects is selected, the photometry unit 1014 performs the highlight photometry in the entire screen. The flowchart in this case will be described below.

Figure 13:
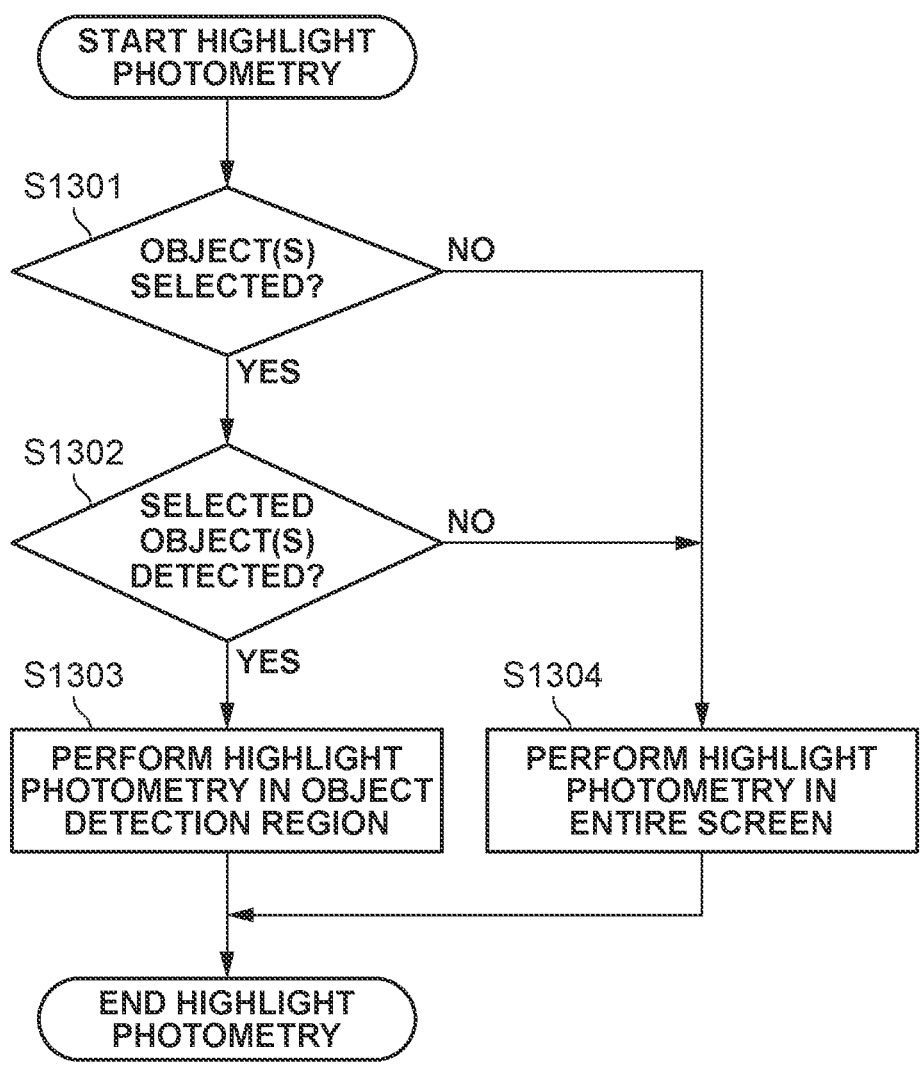
FIG. 13 is a diagram illustrating the highlight photometry according to a third exemplary embodiment.

Processing procedure of live view static image capturing according to the present exemplary embodiment is similar to the processing procedure of the flowchart illustrated in FIG. 5 and the processing according to the first exemplary embodiment. Thus, the redundant descriptions will be omitted. According to the present exemplary embodiment, in a case where the camera system control unit 1001 determines that the highlight photometry has been set as the photometry method (YES in step S501 in FIG. 5), the processing enters the flowchart illustrated in FIG. 13. FIG. 13 is a diagram illustrating processing procedure of the highlight photometry in the present exemplary embodiment. Each processing of this flowchart is executed by the camera system control unit 1001 or various units of the camera body 1000 based on instructions issued from the camera system control unit 1001.

In step S1301, the camera system control unit 1001 determines whether the user has selected (set) an object in advance. In a case where the camera system control unit 1001 determines that an object has been selected (YES in step S1301), the processing proceeds to step S1302. In a case where the camera system control unit 1001 determines that no object has been selected (NO in step S1301), the processing proceeds to step S1304. In step S1304, the photometry unit 1014 performs the highlight photometry in the entire screen.

In step S1302, the detection unit 1013 determines whether the object selected by the user has been detected. In a case where the detection unit 1013 determines that the object selected by the user has been detected (YES in step S1302), the processing proceeds to step S1303. In step S1303, the photometry unit 1014 performs the highlight photometry by only using evaluation values in the object detection region. On the other hand, in a case where the detection unit 1013 determines that the object selected by the user has not been detected (NO in step S1302), the processing proceeds to step S1304. In step S1304, the photometry unit 1014 performs the highlight photometry in the entire screen.

Figure 14A:
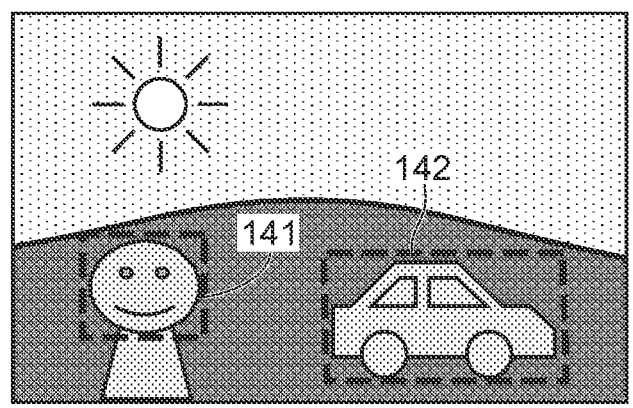
FIG. 14A is a diagram illustrating a screen of object detection regions corresponding to a menu selection example illustrated in FIG. 12.
Figure 14B:
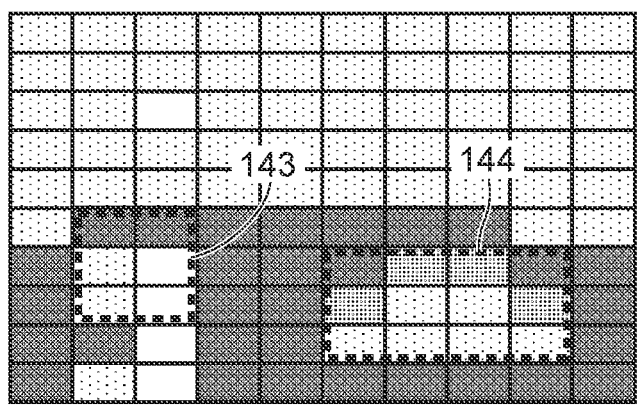
FIG. 14B is a diagram illustrating evaluation values corresponding to the screen illustrated in FIG. 14A.

The highlight photometry in the detection region in step S1303 in FIG. 13 will be described below with reference to FIGS. 14A and 14B. FIG. 14A is a diagram illustrating an image of the highlight photometry corresponding to the example of menu selection on the display illustrated in FIG. 12. In FIG. 14A, a detection region 141 is of the human head, and a detection area 142 is of the vehicle. FIG. 14B is a diagram illustrating evaluation values corresponding to the image in FIG. 14A. In FIG. 14B, regions 143 and 144 represent evaluation values corresponding to the detection regions 141 and 142 of the human head and the vehicle, respectively. In this case, the camera system control unit 1001 knows that the user has selected "Human Head" and "Vehicle" by the processing in step S1301. In the highlight photometry in the detection region in step S1303, the photometry unit 1014 performs the highlight photometry based on evaluation values corresponding to the objects selected by the user and the largest evaluation value in a region combining the regions 143 and 144.

As described above, according to the third exemplary embodiment, photometry is performed in the region of the object(s) specified by the user in the highlight photometry mode in which exposure is determined based on the maximum output photometry value in the photometry region. Thus, exposure control to prevent overexposure of the object specified by the user is performed, whereby exposure control intended by the user is performed.

A fourth exemplary embodiment is to address an issue that the exposure control may be not to be appropriately performed if a detected object is not an object intended by the user. According to the present exemplary embodiment, in a case where a detection object has been selected by other functions when the user selects a type of an object, the region of which is to be set as a highlight photometry region, the default value of object selection for the highlight photometry is adjusted to the object type selected by other functions.

Processing procedure of the static image capturing according to the present exemplary embodiment of the disclosure will be described below with reference to the flowcharts in FIGS. 5 and 13 and displays illustrated in FIGS. 15A and 15B. Each processing of the flowchart is executed by the camera system control unit 1001 or various units of the camera body 1000 based on instructions issued from the camera system control unit 1001.

Processing procedure of the live view static image capturing according to the present exemplary embodiment is similar to the flowchart in FIG. 5. In a case where the camera system control unit 1001 determines that the highlight photometry has been set as the photometry method (HIGHLIGHT PHOTOMETRY in step S501 in FIG. 5), the processing enters the flowchart illustrated in FIG. 13. This processing is similar to the processing in the third exemplary embodiment, and the redundant descriptions will be omitted. While, in the present exemplary embodiment, the user selects an object which is to be a target of when the highlight photometry is performed in the object detection region, this processing is similar to that in the third exemplary embodiment, and the redundant descriptions will be omitted.

In the fourth exemplary embodiment, in a case where a detection object has been selected by other functions when the user selects a type of an object, the region of which is to be set as a highlight photometry region, a default value of object selection for the highlight photometry is adjusted to the object type selected by other functions. For example, FIG. 15A is a diagram illustrating an image of the menu selection screen of a case in which, in the Auto Focus (AF) function with which the camera automatically performs focusing, the object to be focused is selectable (settable) by the user in advance and when a human head has been selected by the AF function.

In a case where the user has selected a human head as an AF target object as illustrated in FIG. 15A, it can be considered that the user intends to capture an image of a human head. FIG. 15B is a diagram illustrating a default setting of an object selection menu screen for the highlight photometry in the above-described case. As illustrated in FIG. 15B, when a human head has been selected as an AF target object, a human head is also selected as the default setting of object selection for the highlight photometry. As described above, in the present exemplary embodiment, the default setting of object selection for the highlight photometry is adjusted to a type of a detection object selected by other functions, to coincide the object for the highlight photometry with the object that the user intends to capture.

Figure 16:
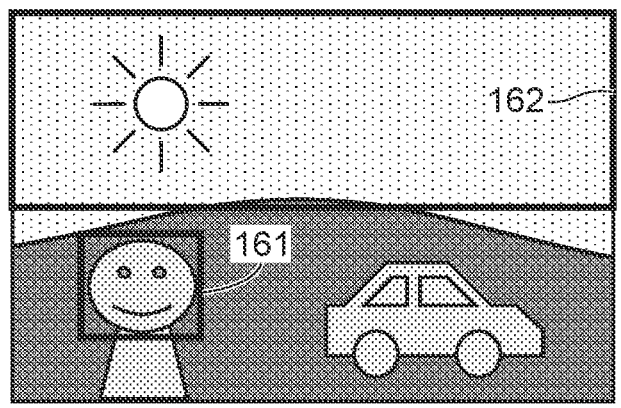
FIG. 16 is a diagram illustrating an image of object detection frames displayed for the AF function and the highlight photometry.

The object selection for the highlight photometry may be changed from the default setting by the user. More specifically, the user may possibly select (set) an object different from the one selected (set) by other functions, such as AF. FIG. 16 is a diagram illustrating an image of detection frame display displayed when a human head has been set as an AF detection target object and the sky has been selected as a detected object for the highlight photometry. A frame 161 in FIG. 16 indicates a detection frame of the AF function, and a frame 162 indicates a detection frame of the highlight photometry. In a case where a detection object selected by other functions and a detection object in the highlight photometry are different from each other, as illustrated in FIG. 16, both of the detection frames may be displayed together. In this case, the frames 161 and 162 may be displayed in different colors. This allows the user to check that the object selected by other functions, such as AF, and the object selected for the highlight photometry are different from each other.

As described above, according to the present exemplary embodiment, in the highlight photometry mode in which exposure is determined based on the maximum output photometry value in the photometry region, the default setting of object selection for the highlight photometry is adjusted to the type of a detection object which has been selected by other functions, such as AF. This makes it easier to make object setting that conforms to the user's intention.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-188973, filed Nov. 28, 2022, which is hereby incorporated by reference herein in its entirety.

What is claimed is:

1. An apparatus comprising:
 at least one processor;
 at least one memory coupled to the at least one processor storing instructions that, when executed by the at least one processor, cause the at least one processor to function as:
 an acquisition unit configured to acquire an image;
 a detection unit configured to detect an object from the image;
 a calculation unit configured to calculate luminance values of the image; and
 a photometry unit configured to perform photometry on the image in accordance with a set photometry mode,
 wherein the photometry mode includes a first photometry mode in which an exposure is determined by weighting a region having a relatively high luminance value in comparison with a region having a relatively low luminance value at least in a photometry region,
 wherein, in a case where the detection unit detects the object in the image in a state where the first photometry mode is selected, the photometry unit performs photometry in the first photometry mode by using a region of the object as the photometry region,
  wherein the photometry unit changes photometry processing in accordance with the type of the object detected by the detection unit, and
  wherein, in a case where the detection unit detects a vehicle, the photometry unit determines the exposure by using photometry values of a first image and photometry values of a second image acquired after the first image, and an average of photometry values of one or more images acquired before the first image.

2. An apparatus comprising:
 at least one processor;
 at least one memory coupled to the at least one processor storing instructions that, when executed by the at least one processor, cause the at least one processor to function as:
  an acquisition unit configured to acquire an image;
  a detection unit configured to detect an object from the image;
  a calculation unit configured to calculate luminance values of the image; and
  a photometry unit configured to perform photometry on the image in accordance with a set photometry mode,
 wherein the photometry mode includes a first photometry mode in which an exposure is determined by weighting a region having a relatively high luminance value in comparison with a region having a relatively low luminance value at least in a photometry region,
 wherein, in a case where the detection unit detects the object in the image in a state where the first photometry mode is selected, the photometry unit performs photometry in the first photometry mode by using a region of the object as the photometry region,
 wherein the photometry unit changes photometry processing in accordance with the type of the object detected by the detection unit, and
 wherein, in a case where the detection unit detects a region corresponding to the sky, the photometry unit lowers the exposure based on photometry in the first photometry mode by an amount smaller than an amount of a case in which no region corresponding to the sky is detected.

3. An apparatus comprising:
 at least one processor;
 at least one memory coupled to the at least one processor storing instructions that, when executed by the at least one processor, cause the at least one processor to function as:
  an acquisition unit configured to acquire an image;
  a detection unit configured to detect an object from the image;
  a calculation unit configured to calculate luminance values of the image; and
  a photometry unit configured to perform photometry on the image in accordance with a set photometry mode,
 wherein the photometry mode includes a first photometry mode in which an exposure is determined by weighting a region having a relatively high luminance value in comparison with a region having a relatively low luminance value at least in a photometry region,
 wherein, in a case where the detection unit detects the object in the image in a state where the first photometry mode is selected, the photometry unit performs photometry in the first photometry mode by using a region of the object as the photometry region, and
 wherein, in a case where the detection unit detects the object in a first image in the first photometry mode and detects no object in a second image acquired after the first image, the photometry unit limits a variation amount of the exposure.

4. The apparatus according to claim 3, wherein the photometry unit determines the exposure by using photometry values of the first image and photometry values of the second image, and an average of photometry values of one or more images acquired before the first image.

5. An imaging apparatus comprising:
 a sensor configured to capture an object image; and
 the apparatus according to claim 3.

6. A method for controlling an apparatus, the method comprising:
 acquiring an image;
 performing photometry on the image in accordance with a set photometry mode;
 detecting an object from the image; and
 limiting a variation amount of the exposure, in a case where the detecting detects the object in a first image in the first photometry mode and detects no object in a second image acquired after the first image,
 wherein the photometry mode includes a first photometry mode in which an exposure is determined by weighting a region having a relatively high photometry value in comparison with a region having a relatively low photometry value at least in a photometry region, and wherein, when an object is detected in the image in a state where the first photometry mode is selected, photometry is performed in the first photometry mode by using a region of the object as the photometry region.

7. A non-transitory computer-readable storage medium storing a program for causing a computer to execute a method, the method comprising:

acquiring an image;

performing photometry on the image in accordance with a set photometry mode;

detecting an object from the image; and limiting a variation amount of the exposure, in a case where the detecting detects the object in a first image in the first photometry mode and detects no object in a second image acquired after the first image, wherein the photometry mode includes a first photometry mode in which an exposure is determined by weighting a region having a relatively high photometry value in comparison with a region having a relatively low photometry value at least in a photometry region, and wherein, when an object is detected in the image in a state where the first photometry mode is selected, photometry is performed in the first photometry mode by using a region of the object as the photometry region.

* * * * *